(12) United States Patent
Rose et al.

(10) Patent No.: US 10,488,555 B2
(45) Date of Patent: Nov. 26, 2019

(54) METHOD FOR DETERMINING WEATHER FORECASTS WITH HUMAN OVER-THE-LOOP OVERSIGHT BY APPLYING FILTERS, QUALIFIERS AND BLURBS ON GEOGRAPHIC LOCATIONS USING MANUALLY PLACED CONSTRAINTS

(71) Applicant: The Weather Channel, LLC, Atlanta, GA (US)

(72) Inventors: Bruce L. Rose, Concord Township, OH (US); Andrew William Tupaj, Billerica, MA (US)

(73) Assignee: DTN, LLC, Omaha, NE (US)

( * ) Notice: Subject to any disclaimer, the term of this patent is extended or adjusted under 35 U.S.C. 154(b) by 683 days.

(21) Appl. No.: 14/804,917

(22) Filed: Jul. 21, 2015

(65) Prior Publication Data
US 2016/0025896 A1    Jan. 28, 2016

Related U.S. Application Data

(60) Provisional application No. 62/027,288, filed on Jul. 22, 2014.

(51) Int. Cl.
*G01W 1/10* (2006.01)
*G01W 1/02* (2006.01)

(52) U.S. Cl.
CPC ............. *G01W 1/10* (2013.01); *G01W 1/02* (2013.01)

(58) Field of Classification Search
CPC .......... G01W 1/10; G01W 1/02; G01W 1/00; G06Q 10/06
USPC ............................................................. 702/3
See application file for complete search history.

(56) References Cited

U.S. PATENT DOCUMENTS

| | | | | |
|---|---|---|---|---|
| 6,339,747 | B1 * | 1/2002 | Daly | G01W 1/10 702/3 |
| 7,062,066 | B2 * | 6/2006 | Wolfson | G01S 13/86 382/100 |
| 9,285,504 | B2 * | 3/2016 | Dannevik | G01W 1/10 |
| 2002/0114517 | A1 * | 8/2002 | Wolfson | G01S 13/86 382/181 |

(Continued)

OTHER PUBLICATIONS

International Search Report and Written Opinion, dated Dec. 4, 2015, received in connection with International Patent Application No. PCT/US2015/041446.

*Primary Examiner* — Gene N Auduong
(74) *Attorney, Agent, or Firm* — Kutak Rock LLP; Sean P. Connolly

(57) ABSTRACT

Methods and systems for providing a "Human over-the-loop" or HOTL processing of weather forecasts. A forecaster may create and manage polygonal Filters, Qualifiers and Blurbs (FBQ's) that can be used to adjust the forecast or describe the forecast for the spatial area circumscribed by the FBQ polygon. The filters are placed manually and act to constraint or modify the digital forecast data over some time range of hours or even days into the future. The filters act to limit the machine-sourced forecasts into acceptable or smart thresholds from unacceptable or un-wise thresholds. HOTL is a Forecast on Demand system that delivers voluminous and rapidly changing forecast guidance that flows unimpeded to outward facing publication platforms and is instantly available to end users and consumers.

8 Claims, 12 Drawing Sheets

(56) References Cited

U.S. PATENT DOCUMENTS

| | | | |
|---|---|---|---|
| 2003/0156734 A1* | 8/2003 | Wolfson | G01S 13/86 |
| | | | 382/100 |
| 2004/0010372 A1 | 1/2004 | Schwoegler | |
| 2007/0049260 A1 | 3/2007 | Yuhara et al. | |
| 2014/0012864 A1 | 1/2014 | Nakagawa | |
| 2014/0303893 A1* | 10/2014 | LeBlanc | G01W 1/10 |
| | | | 702/3 |

* cited by examiner

| No. | Name | Description | Actions on 15 minute forecasts | Possible Qualifier | Severity |
|---|---|---|---|---|---|
| 1 | NO_PRECIP | Points under this shield cannot have falling precipitation forecasts. This is to prevent spurious precip forecasts in regimes that are categorically dry or stable. | The PoP will be thresholded at 25%; i.e. no calculated PoP will be allowed to exceed the threshold value. QPF will be set to 0.0. | NONE | 1 |
| 2 | NO_ICE | Points under this shield cannot have sensible weather types that contain ice. This is to prevent freezing rain or ice pellets in regions where no warm layers are found aloft, yet the surface temperature is below freezing or CPOX thresholds are below minimums. | TBD. The temperature may be thresholded to 34F to assure no freezing rain or the CPOS may be forced above 60% or below 40% depending on other parameters. | NONE | 2 |
| 3 | SEVERE_YS | Any precipitation forecast will be considered of the type acid. Severe. This is to recognize regimes where supercells dominate and all precipitating cells are potentially severe. | POT and CPOI values are set accordingly to trigger severe results. | Hail, Wind, or tornado qualifier. | 3 |
| 4 | NO_SNOW | Ice and freezing rain are possible in this regime, but dendritic flakes or snow/SB cannot be produced because a significant depth of the column is above freezing. | CPOS must be forced to less than 40% or 60%. | NONE | 2 |
| 5 | TROPICAL | Tropical storm conditions will impact the point during the next 24 hours. | Wind threshold. | Tropical storm conditions will arrive within the next 6 hours. | 4 |
| 6 | HURRICANE | Hurricane conditions will impact the point during the next 12 hours. | Wind threshold. | Hurricane conditions will arrive within the 6 hour period. | 5 |
| 7 | AIR_MASS_CONV | Hit and miss thunderstorms can develop and impact the point at any time during the period | POT thresholds, PoP maxima, possible duration checks. | NONE | 1 |
| 8 | BLIZZARD | Severe winter weather conditions are in effect in the 12-hour period | Wind visibility thresholds and precip type are set to snow. | Travel is not recommended | 4 |
| 9 | LAKE_EFFECT | Precipitation is lake-effect or ocean effect that may be persistent or showery | | NONE | 2 |
| 10 | WINDY | The main weather story is wind and this needs to be carried into the hourly forecasts | A wind threshold is established for every forecast time step. | Wind gusts may exceed <nn> | 3 |

FILTER PROPERTIES [SUBMIT] [CANCEL CHANGES]

POLYGON V [0000004147]  FILTER NUMBER [1080] — 1002
FILTER NAME [M_SUNNY]  ABBREV. [SUNNY]
1004 — FILTER GROUP [CLOUD]  PROJECT [1]
STATUS [FUTURE]

START TIME [JUN 16] [▼] [02] [▼]
☑ END TIME [JUN 18] [▼] [32] [▼]

☐ RECURRENCE [32] [⇅] DAYS  ☐ CURRANT SIGN
1006

FORECASTER [ELEAN] [TAKE OWNERSHIP]
OFFICE [BIRMINGHAM] [▼]
LAST MODIFIED [6/17/2014 12:41:24 PM]

[EDIT CONSTRAINTS ...] [MORPH] [DELETE FILTER] [EXPORT SHAPE]

1008

CHILD REGIONS

REGION 1

[ADD REGION] [REMOVE SELECTED REGIONS] [PROPERTIES]

*FIG. 10*

METHOD FOR DETERMINING WEATHER FORECASTS WITH HUMAN OVER-THE-LOOP OVERSIGHT BY APPLYING FILTERS, QUALIFIERS AND BLURBS ON GEOGRAPHIC LOCATIONS USING MANUALLY PLACED CONSTRAINTS

CROSS-REFERENCE TO RELATED APPLICATION

This application claims priority to U.S. Provisional Patent Application No. 62/027,288, filed Jul. 22, 2014, entitled "Generating Weather Forecasts with Human Over-the-Loop Oversight," which is incorporated herein by reference in its entirety.

BACKGROUND OF THE DISCLOSURE

The conventional weather forecast process is typically organized along a forecast assembly line that is termed "human-in-the-loop" (HITL) or Meteorologist in the loop (MITL). The process begins with the rapid and near real-time collection and organization of a single numerical or statistical weather prediction model (NWP or Model Output Statistics—MOS) or, more commonly, a plurality of NWP's and MOS's (loosely called Statistical Weather Prediction or SWP since they represent some ensemble or composite or smart assemblage of real-time prediction of the weather for the same time and space). These forecasts are provided for a set of parameters in two or three spatial dimensions (for example temperature, chance of precipitation, winds, and humidity) usually at regularly spaced points within some domain or over the entire earth (a so-called gridded forecast), at some time step or interval (the forecast time step or temporal resolution), and for some period into the future (the weather forecast duration or valid time). The most recent or contemporaneous collection of these objective gridded digital forecasts is called "guidance" since it represents the starting point or "first-guess" for the HITL forecaster.

Using computer visualization and graphical editing tools, the HITL forecaster reviews, edits, applies quality-controls, and adds human meteorological expertise (value-add) to this grid (or cube or N-dimensional collection) of weather forecast elements. The editing of the perishable forecast data is performed as quickly as possible, but there is often a great deal of activity in this editing window or time interval with multiple forecasters, working on many weather variables, over large domains, and even in different physical forecast offices or locations. Sometimes, the HITL forecaster will choose to withhold new guidance as an input to their editing system; instead, they will keep the modified "going" digital forecast since this will reduce rework and might speed the movement along the HITL assembly line. Since weather elements are continuous in space and time (for example, the predicted temperature 12 hours in the future)—the HITL process will generally hold the guidance or initial forecast until all review and changes are made by the forecast staff. Finally, the edited forecasts are released or pushed to downstream systems or users. Here, the digital forecasts can be translated and post-processed into the familiar weather content we see today on TV, web sites, digital devices, and other content platforms.

In the current HITL paradigm, there are interrelated factors that conspire to weather forecast skill, i.e., they reduce the expected skill of the man-machine forecast. For example, due to continuity, forecast edits cannot be made piecemeal. The entirety of the guidance is withheld from the downstream processing and publishing until the review and editing task is complete. If the area of responsibility of a forecast is large and the spatial and temporal resolution is fine-scale, the time taken to review and edit many weather elements at many time steps can be long; perhaps 2-3 hours in total elapsed time.

The granularity of NWP and SWP forecasts (guidance) is rapidly increasing over time. There are global models or simulations with spatial resolution on the order of 10 km (about 10 million gridpoints on the earth's surface), and there are regional models with resolution on the order of 1 km (this would be about 10 million gridpoints in the Conterminous United States or CONUS). Temporal resolution is typically 1 to 3 hours for these same models, and the models can run as much as 384 hours into the future (16 days). Most importantly, the models are run multiple times per day. Global models are now typically running 4× daily and regional models (on the scale of CONUS) may run hourly. This rapidly flowing output represents huge amounts of data for both machine and forecaster to digest.

In the HITL process, the forecaster must corral at least a portion of this voluminous forecast guidance into a holding pen. Once there, the guidance is cleaned and edited to a point where it is acceptable for downstream consumption. While the HITL process takes place, more guidance is arriving upstream, and simultaneously, the downstream forecasts are aging. The technological and scientific boon of higher resolution and more varied NWP and SWP—and more frequent NWP and SWP—creates a critical dilemma for the HITL forecaster and forecast process, and one that will exacerbate with time as guidance becomes more voluminous in time and space and variety.

SUMMARY OF THE DISCLOSURE

Methods and systems for providing a "Human over-the-loop" or HOTL processing of weather forecasts. The present disclosure bypasses the inherent lag or latency in the HITL process using a practical means of synchronizing or parallelizing the forecast process. That is, this new HOTL paradigm or tool changes the flow of forecast guidance and forecaster edits or inputs or modifications to occur simultaneously or in parallel, in order to remove the serial latency or lag of the HITL forecast process. The disclosure herein provides benefits both to the modern day forecaster and those users consuming the modern day weather forecast.

For example, a forecaster may create and manage polygonal Filters, Qualifiers and Blurbs (FBQs) that can be used to adjust the forecast or describe the forecast for the spatial area circumscribed by the FBQ. The filters are placed manually by HOTL forecasters and act to constrain or modify the digital forecast data over some time range of hours or even days into the future. The filters act to limit the machine-sourced guidance forecasts into acceptable or smart thresholds from unacceptable or un-wise thresholds. Qualifiers are short predefined texts that augment and amplify the digital forecast. Blurbs are more verbose or freeform texts that are also provided by the forecaster or weather forecast expert using the FBQ polygon paradigm. Blurbs add weather content to the digital forecast that helps notify or alert users to imminent high impact weather or underscore important upcoming weather. HOTL is a Forecast on Demand system that will modify and add value to hourly high-frequency world-wide digital forecasts. Content is created and delivered to end users from the freshest available Numerical Weather Prediction (NWP) data. This selective forecast modification is accomplished without delaying the movement of machine-sourced forecasts to the user or to downstream forecast publishing platforms. This enables the lowest latency and the most resolute forecast content possible. Using HOTL processing techniques, forecast guidance flows unimpeded to publication. Because of the decoupling of the forecaster intervention, value-add and editing activity from the flow of machine forecasts to the end user, the HOTL approach is insensitive to the frequency or volume of new computer guidance arriving from objective numerical and statistical weather prediction modeling sources. This is a superior way forward with respect to optimizing the man-machine mix necessary in modern operational weather forecasting and weather forecast dissemination.

This summary serves as an introduction to the subject matter of the disclosure. These and other features will be described in more detail below.

BRIEF DESCRIPTION OF THE DRAWINGS

The present disclosure is described with reference to the accompanying drawings. In the drawings, identical reference numbers indicate identical or functionally similar elements.

FIG. 5 illustrates an example, non-limiting set of filter definitions;

FIG. 10 illustrates an example filter properties dialog box; and

DETAILED DESCRIPTION OF THE DISCLOSURE

Overview

Figure 1:
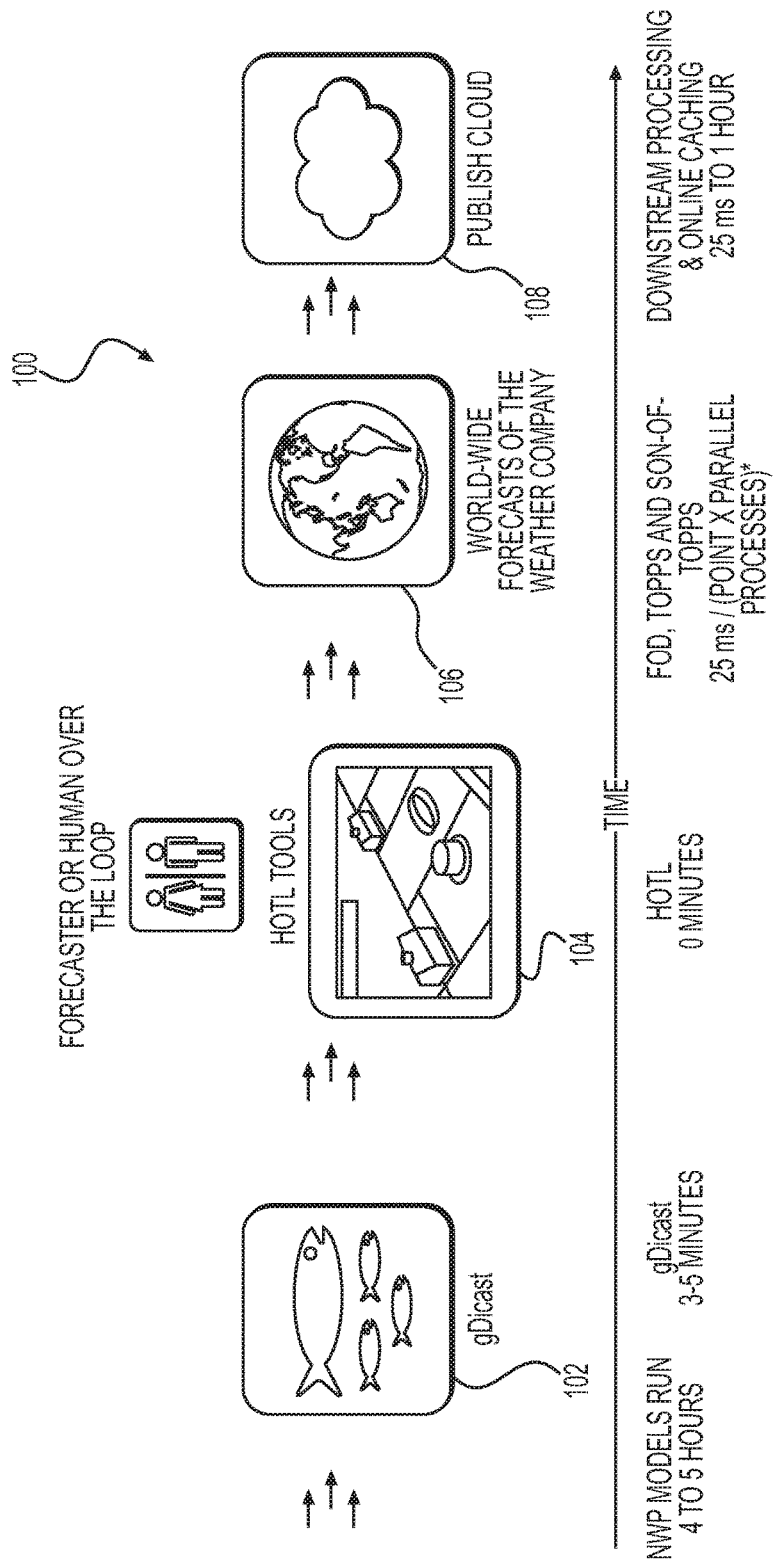
FIG. 1 illustrates an overview of an example operational flow of Human Over-the-Loop (HOTL) processing in accordance with the present disclosure.

The present disclosure describes methods and systems that mitigate or remove the increasing time delay in the HITL editing process, while still allowing the human value-add to forecast skill and quality. This process is called herein "Human over-the-loop" or HOTL. HOTL is a Forecast on Demand system that modifies and adds value to, e.g., hourly (or other output time intervals) world-wide digital forecasts. Content is created and delivered to end-users from the freshest available Numerical Weather Prediction (NWP) and/or Statistical Weather Prediction (SWP) data. This enables the lowest latency and the most resolute forecast content possible, while maintaining human oversight and expertise in the forecast process.

In the HOTL system, a forecaster moves from a conventional hold-and-edit role to an oversight role in order to eliminate any lag in the forecast. Instead of editing the data site by site, the forecaster may create and manage polygonal Filters, Qualifiers and Blurbs (FBQs) that can be used to adjust the forecast or describe the forecast for the area selected within the FBQ. Filters are manually placed constraints on a Forecast on Demand (FOD) or a guidance forecast. Filters are time-dependent and apply to, e.g., either Nowcast (a short-term weather forecast for the very near term; often 0-6 hours hence), Daypart (forecast weather conditions, temperature, and winds for the natural day subdivisions like "Today", "Tonight", etc.), or 24-hour day (a summary forecast for midnight to midnight, or from one morning to the next). As will be described below, filters push forecasts to Acceptable or Smart thresholds from un-wise or unacceptable thresholds. Filters can act to modify hourly forecasts of weather elements, or can modify entire time series of weather elements. Multiple filters can act on a single forecast, however, they will act serially based on their severity, priority or provenance. In accordance with the present disclosure, filters generally do not change the outcome of an FOD forecast to a great extent; instead, filters limit the degrees of freedom of a forecast outcome to force the forecast into Acceptable or Smart limits. Filters have expiration times, but it is often the passing of the real or wall-clock time that deprecates an existing Filter.

The "Q" in FBQ stands for Qualifier. A qualifier is a brief, predefined string that amplifies, clarifies or provides further explanation to an ongoing forecast. The Qualifier (Q) may be time-dependent and is a function of Nowcast, Daypart, or Day. A single Q is allowed for each of these time divisions. Qualifiers may have priority or severity and this allows selection of Qs when multiple Qs exist for a time division. There may be Auto-Qualifiers that are triggered upon weather reaching predetermined thresholds (like record temperatures). Moreover, there is significant existing weather logic to ensure that Qs are internally consistent with their attendant forecast.

Blurbs are freeform texts provided by a meteorologist or expert that amplifies or alerts users to important upcoming weather or consequences of that important weather. Using the, e.g., polygonal mapping paradigm of HOTL (as described below), a blurb may be defined for, e.g., Demographic Marketing Area (DMA), region or political boundary. A single blurb may be valid for all forecast times or some range of time. Since Blurbs are freeform text composed by the forecaster or meteorologist, they may contain specific wording about local geography, landmarks, and other metadata unique to a city, town, or region.

Thus, HOTL is a Forecast on Demand system that will modify and add value to high-frequency world-wide digital forecasts. HOTL FBQ's are evaluated and act on new NWP or SWP "just in time" or when a user requests a forecast. The raw machine forecast or guidance is pulled through the HOTL filters in order to cleanse the digital guidance of un-wise or unacceptable forecasts—leaving behind smart and acceptable forecasts. Content is created and delivered to end users from the freshest available Numerical Weather Prediction (NWP) data. This enables the lowest latency and the most resolute forecast content possible. Using HOTL techniques, both weather forecast guidance and the latest human interventions and value-adds flow unimpeded to publication.

HOTL Operational Flow

Referring to FIG. 1, there is illustrated an overview of an example operational flow 100 of HOTL processing of forecast data in accordance with the present disclosure. At 102, NWP and/or MOS are converted to Global Dynamic Integrated foreCasts (gDICAST). As would be understood by one of skill in the art, the gDICAST system ingests meteorological data (e.g., observations, models, statistical data, climate data, etc.) and produces meteorological forecasts at user-defined or gridded forecast sites and future forecast valid times. In order to achieve this goal, gDICAST generates independent forecasts from each of the data sources using a variety of forecasting techniques. A single consensus or composite forecast from the set of individual forecasts is generated at each user-defined or gridded forecast site based on a processing method that takes into account the recent skill of each forecast module.

At 104, HOTL tools are applied to the gDICAST forecast. In accordance with the present disclosure, the HOTL tools may include, but are not limited to, constraints, filters, and value-adds (e.g. Qualifiers) that are introduced into a forecast stream. The HOTL tools may be used to modify the forecast data in near real-time, and are described in further detail below. At 106, world-wide guidance forecasts and forecast FBQ's are made available in the Forecast on Demand (FOD) cloud. At 108, the world-wide forecasts are published on demand or just in time as users request specific forecasts. As shown in FIG. 1, the editing time or latency is reduced from 2-3 hours in the HITL process to nearly zero in the HOTL process.

Figure 2:
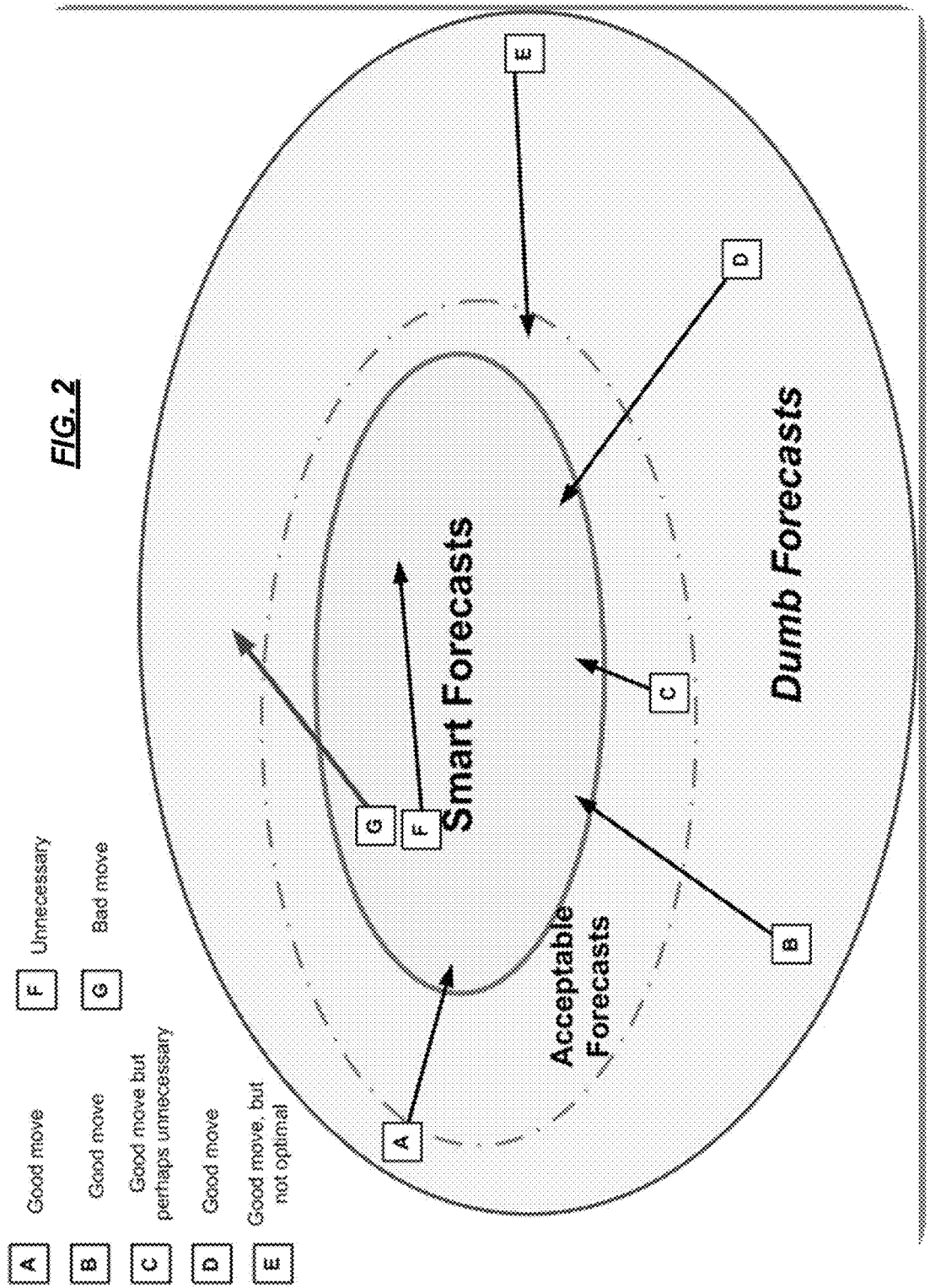
FIG. 2 illustrates an example set of actions performed by the HOTL system.

With reference to FIG. 2, the HOTL processing of FIG. 1 is provided to push "un-wise" forecasts into acceptable or smart forecasts. An "un-wise" forecast, for example, may be a forecast that is at odds with weather community's consensus forecast. The "un-wise" forecast may lack intelligent context such as a scattered thunderstorm forecast in the midst of a land-falling hurricane, or a forecast that has no mention of frost or freeze on a record cold winter night in the middle of the Florida Citrus belt. In addition, an un-wise forecast might miss precipitation in the very short-term or precipitation that is supposed to develop in the short-term when this would be obvious to a human forecaster or ground observer. As another example, an "un-wise" forecast may call for an erroneous precipitation type, intensity, or regime. "Un-wise" forecasts may also miss aberrant or rare weather, such as freezing drizzle, blizzard, snow squalls, tropical storm conditions, etc., when such conditions will occur. Yet another example is a forecast that flip-flops due to rapid changes in weather guidance, statistical residue, or stochastic or numerical feedbacks or instabilities (e.g., patchy heavy rain). In brief, an un-wise forecast is one that lacks awareness of context of the overall weather situation, or is counter to a prevailing sense of the future weather's likely outcome or impact on the public or individual consumers. Thus, as shown in FIG. 2, the HOTL forecaster utilizes the HOTL tools at 104 to create filters, qualifiers, blurbs and other value-adds and/or constraints to reshape un-wise forecast the realm of acceptable or smart forecast space.

Filters, Qualifiers and Blurbs (FBQ) Processing

Figure 3:
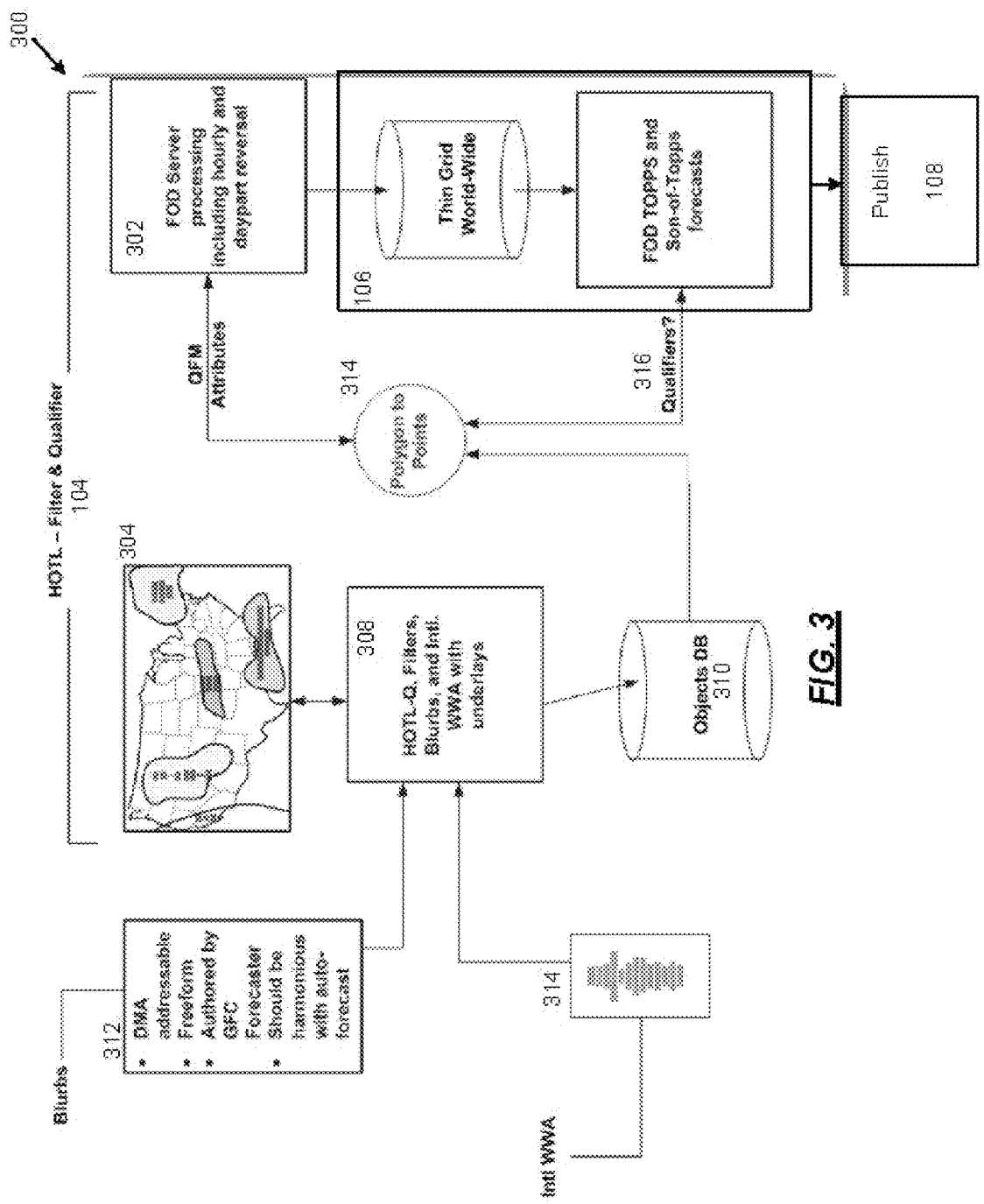
FIG. 3 illustrates the HOTL processing flow of FIG. 1 in greater detail.

With reference to FIG. 3, there is illustrated the HOTL processing flow of FIG. 1 in greater detail. Forecast data may be provided to the processing flow 300 by a server 302 (e.g., an FOD server). The forecast data may be any forecast data, such as Observations or Current Conditions, Nowcasts (e.g., 0-6 hour forecasts), Daypart, or Day. The operational flow 300 may operate on all hourly forecasts retrieved as part of, e.g., an FOD API request. International advisories 314 may be input to the processing flow 300. The international advisories allow for the creation, editing, and management of watch, warning, and advisories outside of the continental United States.

There are countless other weather constraints, advisories, or value-adds that could be accomplished using this same HOTL technique, as would be understood by one of ordinary skill in the art in view of the present disclosure. That is, drawing closed polygons or clusters of polygons on the earth and attributing properties to that polygon that can then be immediately communicated downstream to forecast publishing platforms or assets. The crucial distinction is that the polygonal objects are distinct from the forecasts themselves and are only evaluated, processed, and combined when a forecast is requested. Because of this, the latest guidance or the latest SWP remains unchanged and partitioned from the forecaster instructions and therefore may flow freely from its source to its destination since it is unconstrained by the need for editing or review.

A forecaster may use a predefined filter 304 from the HOTL tools 104. These predefined filters 304 act to transform the digital forecast such that it conforms to the filter definition or set of constraints. When employed by the forecaster, these filters 304 are variable in time and space, and subject to sets of conditions that limit the actions to a set of gridded forecast points that lie beneath a user-defined polygon(s) for a defined time series, and are valid for a set of user-defined conditions that may include elevation, land-use and ranges of state variables like temperature, PoP, wind speed, etc. The transformation of a raw forecast to a published forecast may involve many steps, and may also imply many transitional states of that forecast as it moves from its raw state to its published state.

Figure 4:
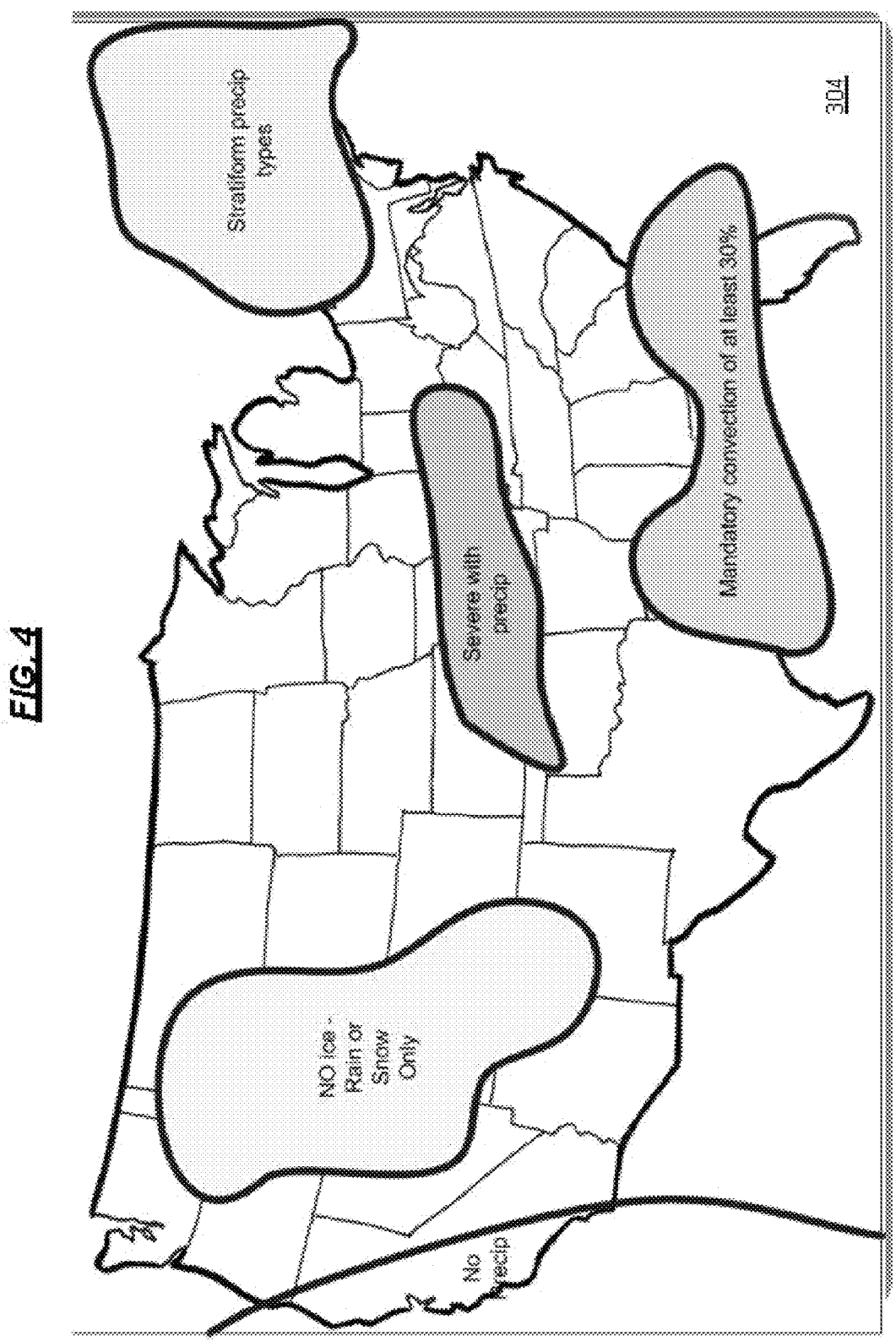
FIG. 4 illustrates example filter polygons.

Filters, as used in accordance with the present disclosure, are manually placed constraints on, e.g., a Forecast on Demand (FOD) or a gDicast forecast. As shown in more detail in FIG. 4, filters may be defined as a region by defining a polygon or series of polygons on the earth's surface. The polygon circumscribes a set of grid points of gDicast forecasts, and defines potential actions across some time interval, or range of forecasts. An action or change in the gridded digital forecast (GDF) is predicated on conditional selection criteria that is set forth in the filter definition or is provided by the forecaster when the filter is introduced in the live forecast. For example, a gDicast hourly forecast point may lie within a polygonal outline and time interval, but it must also conform to an additional set of selection criteria such as elevation or some temperature range before it is subject to Filter actions.

The filter polygon may have a predetermined set of conditions and actions associated therewith. For example, a filter's purpose may be to inhibit all precipitation. In such a case, the filter conditions will be to select points within the polygon based on the probability of precipitation (PoP) exceeding some threshold. The filter action will be to constrain the PoP to lie below the threshold whereby falling precipitation is produced or triggered. FIG. 5 illustrates an example of non-limiting set of Filters.

In accordance with the present disclosure, filters may have "vectors" of conditions and actions. As such:

$\vec{S}_C$=User Constraints Vector $\vec{G}_C[k]$=Genome conditions ($k$ rows or lines)

$\vec{A}_C[k]$=Actions ($k$ rows or lines)

The User Constraints are compound logic that limits point selection and is defined by the forecaster as the filter is created on the current forecast. The Genome conditions are compound logic that determines the weather outcome (e.g. rain showers or thunderstorms imply a complex set of limiting conditions with respect to temperature, cloud cover, PoP, probability of thunder, and rainfall amount). Actions are altered ranges or scalars for which the new digital forecast must conform. Thus, if a digital forecast from guidance meets the selection and genome criteria for a particular point and time that the gridded digital forecast (GDF) will be altered using the filter actions.

Each element of these vectors may be expressed as a range, r1-r2, where a range can be null or blank, and a range can have r1=r2 (e.g. 12-12 would be a legal range). The range is in the same units as the weather or geographic element. For example, an elevation element in the User Constraint Vector may have the units of feet. Ranges are subject to the physically plausible ranges of a variable. For example, temperature ranges may be confined to be between −80° F. and 120° F. The elements of the user Constraint Vector $\vec{S}_C$ may be as follows:

| | |
|---|---|
| Elevation (−2000 to 26000 feet) | ALT |
| Probability of Precipitation (0-100%) | POP01 |
| 1-hour QPF | QPF01 |
| Snow Ratio (unitless number between 0 and 35) | SR |
| Temperature (−80 to 120 F.) | T |
| Dew Point (F) | TD |
| Visibility (SM) | VIS |
| Wind Speed (0-160 mph) | SPEED |
| Cloud Cover (0-100%) | CLCOV |
| Probability of Fog (0-100%) | POF |
| Probability of Thunder (0-100%) | POT |
| Conditional Probability of Snow (0-100%) | CPOS |
| Conditional Probability of Ice (0-100%) | CPOI |
| Conditional Probability of Rain (0-100%) | CPOR |

The elements of the Genome vector $\vec{G}_C[k]$ may be the same as the User Constraint Vector except Snow Ratio (SR), Elevation, and Dew Point are not included, and QPF01 may be scaled by a factor of 100 and shown as QPF01×100. The elements of the Action vector $\vec{A}_C[k]$ are the same as the Genome vector except the Manual Override Flag and SR are added, and QPF06 is expressed as QPF06×100.

In the Genome and Action Vectors there can be multiple rows called subkeys, which may be expressed as arrays with dimension of variable and row. The meaning of additional rows is that there may be alternative sets of genome conditions and actions that satisfy a filter. An example of this would be a Filter of "No Ice." To prevent ice from an hourly forecast, the following genome logic combinations may be addressed:

Each row is therefore a subset of the NOICE filter and it offers an alternative set of AND conditions that satisfy the Genome state of "Ice." Logically, the elements of this array can be easily summarized in terms of conditional tests as sum all columns of row as AND's, or sum each row result as OR's.

In the above example, this would amount to the following compound logic:

If (30≤POP≤100) and (−80≤TEMP≤32) and (0≤CPOS≤39) and (0≤CPOI≤19)
or
If (30≤POP≤100) and (33≤TEMP≤39) and (40≤CPOS≤59) and (0≤CPOI≤19)
or
If (30≤POP≤100) and (−80≤TEMP≤32) and (0≤CPOS≤39) and (20≤CPOI≤100)
or
If (30≤POP≤100) and (33≤TEMP≤39) and (40≤CPOS≤59) and (20≤CPOI≤100)
Then
The Genome conditions are satisfied and the Filter actions should be asserted
Else
The Genome conditions are not satisfied and no action should take place on the gridded digital forecast or GDF.
Endif Thus, there may be four tiers of tests that are passed before a Filter action takes place on a GDF:

Does the GDF fall within the polygonal outline?

Does the GDF fall within the beginning and end times of the defined Filter?

Does the GDF satisfy an AND test of all of the conditional selections or User Constraints (these are generally made at the time of the Filter creation in HOTL)?

Does the GDF satisfy the Genome conditions vector or array (or one of the Genome Conditions subkeys in the case of complex Filters with multiple rows in their predefinition)?

Time Intervals

Each filter may be valid for a specific time interval. This interval may be e.g., a one hour in duration with hourly resolution. Other resolutions and intervals may be defined. The later valid time may be equal to the number of available future hours in the forecast acted upon (e.g., +384 hours). A filter has its upper valid time in the future. For example, a filter with both valid times in the past need not be considered or evaluated. A filter with only partial validity in time need only be evaluated for hours that lie the future.

Time intervals may also have of the property of "recurrence." Recurrence is a time interval is valid for some number of days into the future. A filter with recurrence of 2 means the filter is valid for the current date, as well as for

TABLE 1

Genome rows that can produce icy forecasts. These rows are different forecast vector combinations that result in an ice forecast, and can therefore all represent compound conditionals that can trigger action inhibit or alter the forecast of ice (sleet, freezing rain, or combinations of ice and other precipitation types) that would result from the raw forecast.

| POP | QPF06 × 100 | Temp | Speed | Cloud | POF | POT | CPOS | CPOI | CPOR |
|---|---|---|---|---|---|---|---|---|---|
| 30-100 | | −80-32 | | | | | 0-39 | 0-19 | |
| 30-100 | | 33-39 | | | | | 40-59 | 0-19 | |
| 30-100 | | −80-32 | | | | | 0-39 | 20-100 | |
| 30-100 | | 33-39 | | | | | 40-59 | 20-100 | | two additional days into the future beyond the current day. For example, a filter valid for 12 Mar. 2014 between 06Z and 18Z with a recurrence of 2 is also valid for 13-MAR and 14-MAR between the same time intervals of 06Z to 18Z. The number of recurrences may be limited to the number of days within the forecast availability duration. If recurrence pushes the end time of a filter beyond the end of the forecast availability period, then that filter may be evaluated for every possible hour or valid hour until the end of the forecast period. However, recurrence that lies completely beyond this upper limit may not be evaluated.

Recurrence intervals of a filter can span day boundaries or 00Z. As such, a filter with a time interval of 12 Mar. 2014 18Z through 13 Mar. 2014 06Z can recur for additional days into the future notwithstanding the upper limit constraints on the available forecast period. To prevent recurring events from overlapping one another, a recurring filter may be prevented from having a time interval that spans more than 24 hours. In application, this means a recurring filter might have a time interval from 00-23Z as its maximum duration. Filters can have a recurrence of "forever," which means that the filter recurs on every possible day of the forecast period beginning with the first instance. As real world or wall-clock time advances in the forecast center such a filter will remain in force for all future time steps since it is relative as an offset to the present time.

A filter may be considered inactive if its time interval falls completely before present time (a filter remains in this inactive state for 24 hours, and is then deleted entirely from the database). However, recurrence is taken into account when assessing the age of a filter. For example, if it is 18z on 12 March, a filter that recurs for three days and begins with the period 06Z to 12Z on 12 March is still active. This is because the filter is also valid for three time intervals in the future. A filter that has an upper time limit in the future is still considered active or valid; thus, it is only the time steps or hours that fall in the past that need not be considered or evaluated.

Below are examples of time intervals, present time and recurrence settings. In the second column is the description of proper treatment for a ten day forecast beginning on 12 March at 00Z (240 hours):

Ordering Multiple Polygons

A GDF may often have multiple valid Filters for a single time step. In accordance with the present disclosure, the filters are acted upon serially. Thus, a filter action taken by the first of a series of active Filters, will alter the GDF, and will then provide the new GDF state with respect to all subsequent valid filters.

To facilitate this ordering or serialization of multiple active filters, each predefined filter may have a property that is termed "priority". The priority states are as follows:

TABLE 3

Filter Priorities are used to organize or prioritize multiple filters. The final tie-breaker when no other ordering is possible amongst multiple filters, is to act on higher filter numbers last.

| Type | Description |
|------|-------------|
| 1 | Always first |
| 2 | Always Last. Except for Priority "7" Filters |
| 3 | Never First when multiple |
| 4 | Never last when multiple |
| 5 | Supersedes and nulls all other Active Filters |
| 6 | Is nulled by existence of any other Active Filters |
| 7 | Null all but highest Filter number in Group, and Priority "7" filters are always applied last. |
| 8 | Order is unimportant |

If two filters have the same priority, they are ordered according to the integer value of the filter number. The Filter number may be a 4-digit unique value assigned to each predefined filter. Filters are organized in such a way that more important or impactful filters have higher Filter numbers. Some priority settings may dictate that other filters are to be dropped or nulled, or conversely, they are dropped if other filters exist. For a Type=7, only a single filter from the Filter Group is kept (i.e., the highest ranking or highest numbered Filter in the Group). Moreover, Priority=7 Filters are applied last. The Groups defined in HOTL are:

TABLE 2

Recurrence scenarios that exercise the filter rules imposed on recurring polygons in time - along with explanations of the outcomes.

| Start | End | Date | Recurrence | Wall Clock | Description |
|-------|-----|------|------------|------------|-------------|
| 10Z | 14Z | 12-MAR | 2 | 06Z 12-MAR | This filter is valid for 10-14Z on 12-14 of March |
| 10Z | 14Z | 12-MAR | 2 | 12Z 12-MAR | This filter is valid for 13-14Z on 12-MAR, and is valid for 10-14Z on 13 and 14 of March. |
| 12Z | 23Z | 21-MAR | 2 | 12Z 12-MAR | This filter is valid for 12-23Z on March 21, but is beyond the end of the forecast for the 2 recurrences. |
| 12Z | 23Z | 12-MAR | Forever | 18Z 12-MAR | Valid for 19Z-23Z on 12-MAR. Valid for 12Z to 23Z on each successive day of forecast through the end of the forecast period. |
| 12Z | 12Z | 12-Mar | 1 | 18Z 12-MAR | Valid for 12Z on 13-MAR only. 12-12Z on 12-MAR is in the past so is not considered. |
| 23Z | 00Z | 12/13 - MAR | 3 | 18Z 12-MAR | This is a two hour time interval that spans 00Z. It is valid for all four instances. |

TABLE 4

The filter Group is another property of predefined filters.

| Group | Description |
|---|---|
| OPEN | Open Filter |
| CLOUD | Modifies cloud cover |
| WIND | Modifies wind speed or gust |
| PRECIP | Modifies if dry or wet or precipitation regime |
| THUNDER | Modifies thunder probability or type. |
| QPF | Modifies precipitation intensity |
| ABERRANT | Special outcomes |
| ACCUM | Rain or Snow amounts over some time range. |
| MANWX | Weather types that can only be created via intervention |
| P_TYPE | Modifies precipitation type |

In this GDF example, five Filters are encountered with different Filter numbers and Types. The original and final ordering are shown along with explanatory notes.

Original:

| 0100 | DELTA | 3 |
|---|---|---|
| 1060 | NOPRECIP | 6 |
| 2400 | NOICE | 2 |
| 9000 | FOG | 2 |
| 1600 | STRATIFORM | 1 |

Final:

| 1600 | STRATIFORM | 1 | Always first |
|---|---|---|---|
| 0100 | DELTA | 3 | Never first when multiple Filters |
| 2400 | NOICE | 2 | |
| 9000 | FOG | 2 | Type same as NOICE, but Filter Number is higher |

In the above, the original Filter NOPRECIP is dropped altogether since it is Type=6, and other Filters exist.

Filter Actions

A Filter action may alter a forecast value if the GDF forecast value does not conform to the action range. Action ranges can be expressed in three ways. A Delta action, which increments a GDF value by a positive or negative amount specified in the action. For example, a delta of −2 degrees for temperature would reduce temperature by 2° F. However, a delta of −2° F. for a GDF value of −79° F. would be adjusted to −80° F. since this value is a predefined threshold for the temperature variable.

A second type of range is the Clip Range, which represents a high and low value to which the new GDF conforms. An example of a Clip range for Wind speed might be:

[21-40]

Any GDF wind speed that lies below 21 mph will be set to exactly 21 mph. Any GDF wind speed that lies above 40 mph will be set to 40 mph.

A third type of range is Scaled Range, which represents a proportional range that readjusts the range established in the genome conditional. A scaled range for POP06 could appear as:

|25-54|

With a genome conditional of:

0-80

To find proportionality between the genome range and action range, a scaling coefficient, $\lambda$, is determined. For example, given:

$r_{G1}$=Low end of genome range
$r_{G2}$=High end of genome range
$\psi_i$ =GDF value (e.g. 60% POP06)
Then, the scaling coefficient may be defined as:

$$\lambda = 1 - \frac{(r_{G2} - \Psi_i)}{(r_{G2} - r_{G1})}, \text{ if } r_{G2} = r_{G1} \text{ then } \lambda = 0 \qquad \text{Eq. 1}$$

And the altered or scaled value of $\psi_i$ or $\psi_i^*$ is:

$$\Psi_i^* = r_{A1} + \lambda(r_{A2} - r_{A1}) \qquad \text{Eq.2}$$

Using the example of a genome range of 0-80, and a GDF forecast of 60% POP06 and scaling range of |25-54| then $\lambda$ and $\psi_i^*$ may be determined as:

$$\lambda = 1 - \frac{(r_{G2} - \Psi_i)}{(r_{G2} - r_{G1})} = 1 - \frac{(80 - 60)}{(80 - 0)} = 0.75$$

And:

$$\Psi_i^* = r_{A1} + \lambda(r_{A2} - r_{A1}) = 25 + 0.75 \times (54 - 25) = 46.75\%$$

In other words, 60% penetrates ¾ of the way through the genome range 0-80%, so the new value is scaled in such a way that it is found 75% of the away through the Action range of |25-54|. This happens to compute to a value of 46.75%.

It should be noted if the GDF value falls within the genome range, the action would not be considered and no scaling would take place.

Open Filter

An open filter may be provided to enable forecasters to determine constraints and define actions using a simple filter definition. Simple filters have a single row of constraints and actions (that is, Open Filters may not have subkeys). Open Filters allow for fine control of forecast parameters, or to customize a change to hourly forecasts that are not available in the predefined set of Filters. An open filter has no predefined actions and no predefine serial number. Open filters can have delta, clip, and scaling actions just like predefined filters.

Qualifiers

A Qualifier is a brief predefined text string with meteorological value that can be manually appended to a digital text forecast. Qualifiers often contain forecast information that would normally be difficult for an automated system to discern. Examples would be "likelihood of frost", "total snowfall accumulation", "risk of urban flooding" and other informative value-added texts that are best determined by a human forecaster. Qualifiers or Q's do not alter the digital forecast or GDF in terms of quantities, but they are critical additions to a sensible and informative weather forecast. The HOTL paradigm whereby polygons are ascribed logic conditions and temporal and spatial extent is an excellent and efficient mechanism for forecasters to place and manage weather Q's and is thus provided as an option in the HOTL user interface and capabilities.

Blurb

Figure 6:
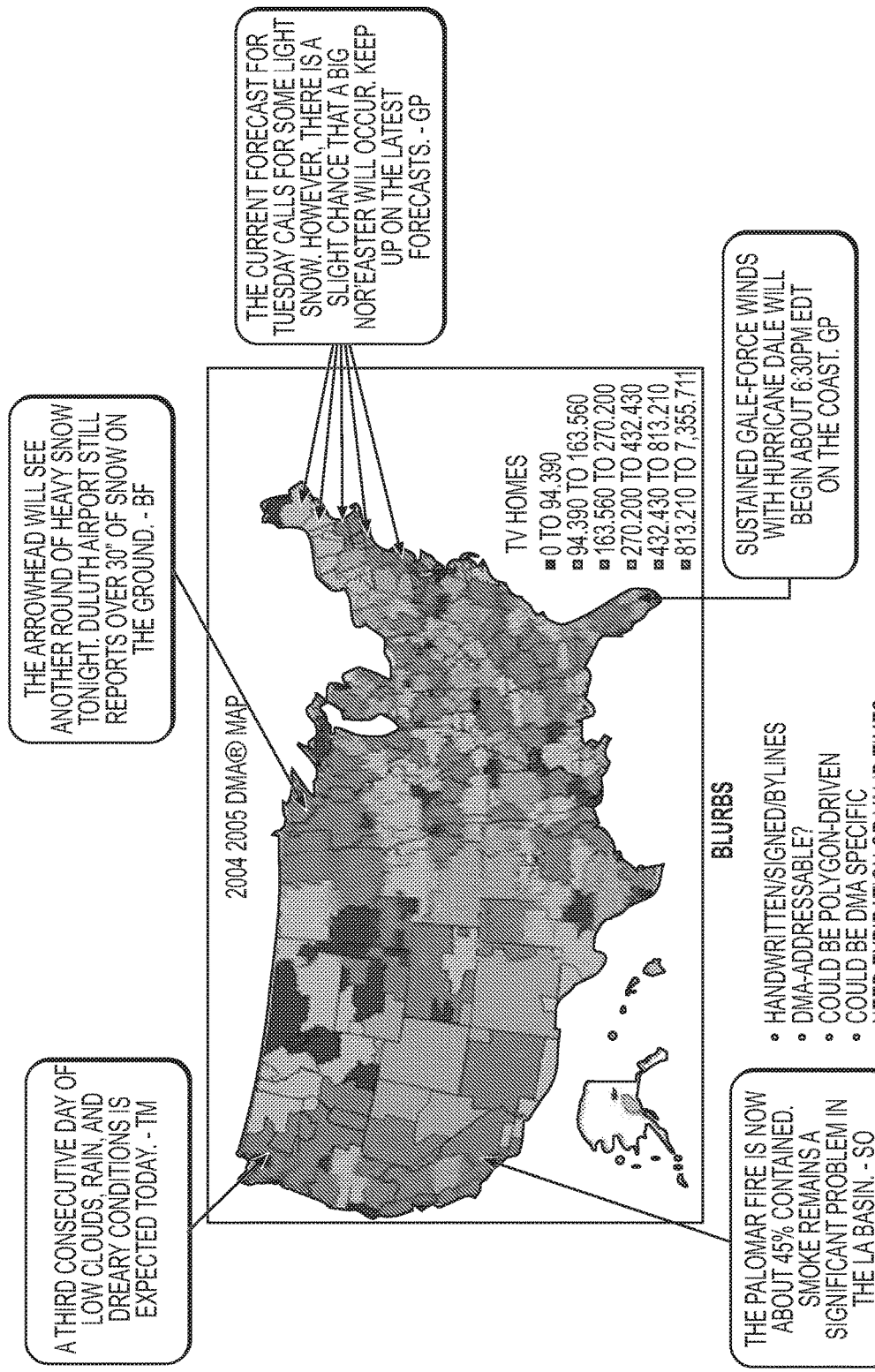
FIG. 6 illustrates example blurbs.

With reference to FIGS. 3 and 6, a blurb 312 is a freeform text of meteorological content attributed to some range of GDF's in time and space, and is subject to the same potential logical constraints of selection as defined in Filters and Qualifiers. A Blurb serial number, author codes, blurb title, verbose blurb content, and terse (Twitter) blurb content should be available via the Graphical User Interface (GUI) of this Processor. The GUI is described in further detail below. At 308, FBQ, international alerts and underlays (described below with reference to FIGS. 8A and 8B) are processed in accordance with the filter ordering, priority, time validity, etc., and stored to an objects database 310. A polygon to points operation 314 is applied to the information in the database 310 and the forecast data provided by the FOD server 302 to determine forecast locations that are to be modified by the filters. Thereafter, qualifiers 316 may be applied. The qualifiers 316 may be a brief, predetermined, codified string that amplifies, clarifies or provides further explanation to an ongoing forecast. Thereafter, the HOTL-modified forecasts are prepared on, e.g., a world-wide basis (at 106) and published at 108.

HOTL—Graphical User Interface (GUI)

Figure 7:
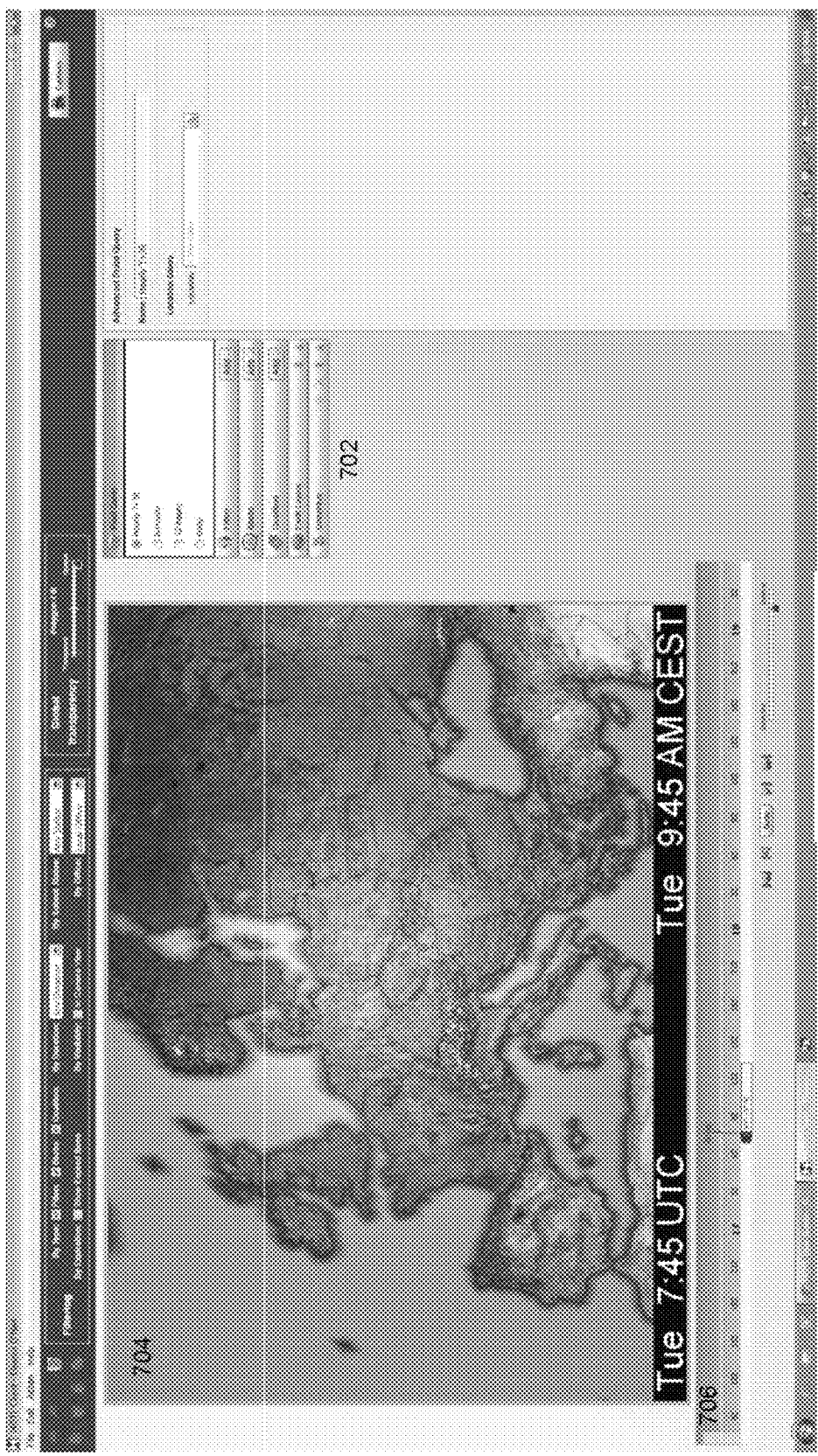
FIG. 7 illustrates an example HOTL Main Screen that may be displayed when the HOTL client application is launched.

FIG. 7 illustrates an example HOTL Main Screen that may be displayed when the HOTL client application is launched. The client application may be used by a forecaster, as described in the overview above. The client application may automatically center on a "home region" that is correlated to the geographic location where the client is located. A list 702 may display Filters, Qualifiers and Blurbs (FBQ's) for the local region. There may be different settings for the different locations. A map area 704 displays the map used as the base for editing. As shown, the map may have coloring to denote topography. A Time Bar 706 provided such that time can be adjusted by either dragging the 'red tab' on the time bar, clicking directly on the time you wish to move to or using the 'forward and back' icons beneath the timeline.

Figure 8A:
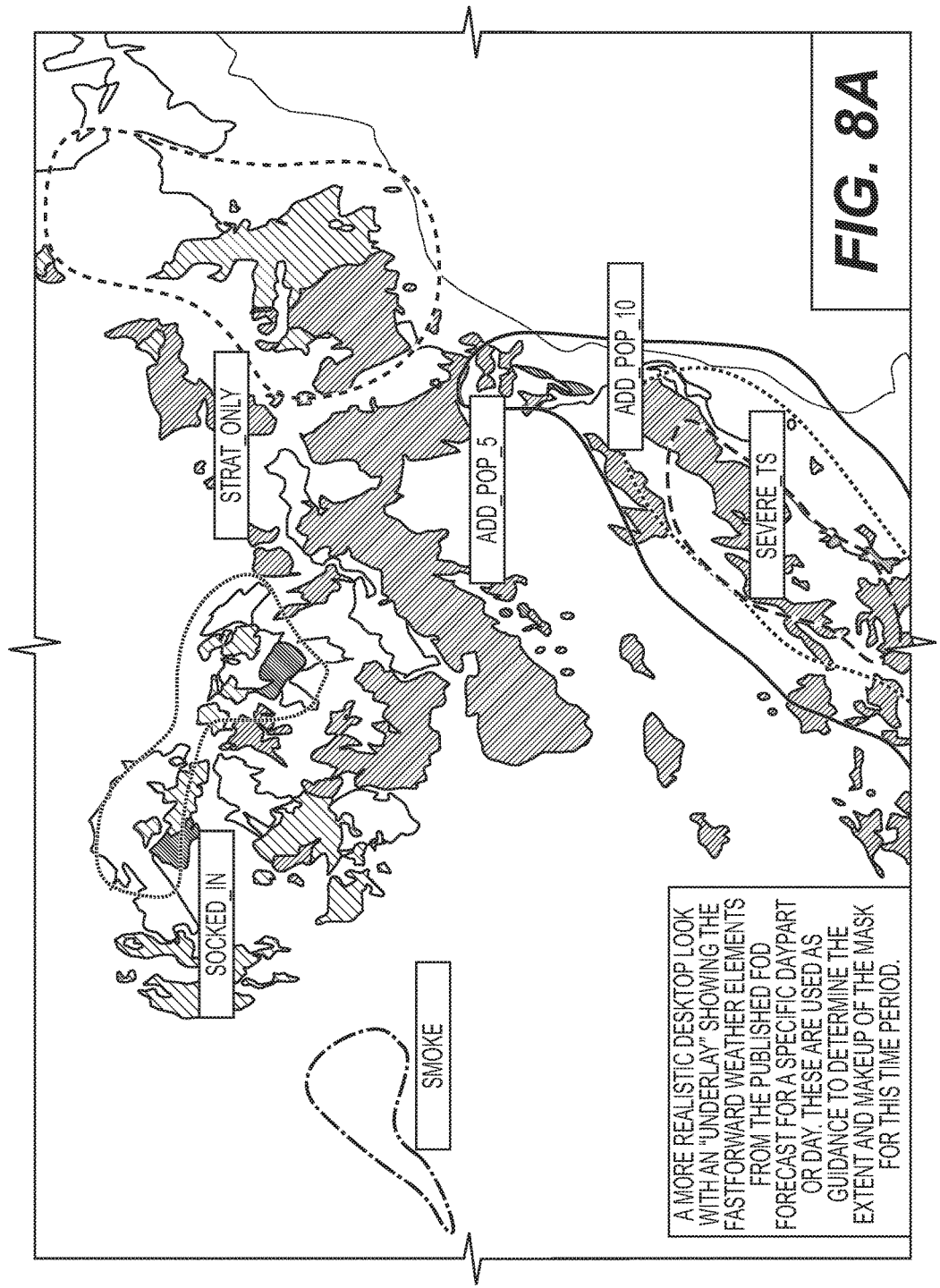
FIGS. 8A and 8B illustrate example underlays, which may provide guidance for the placement of Qualifiers, Filters and Blurbs.
Figure 8B:
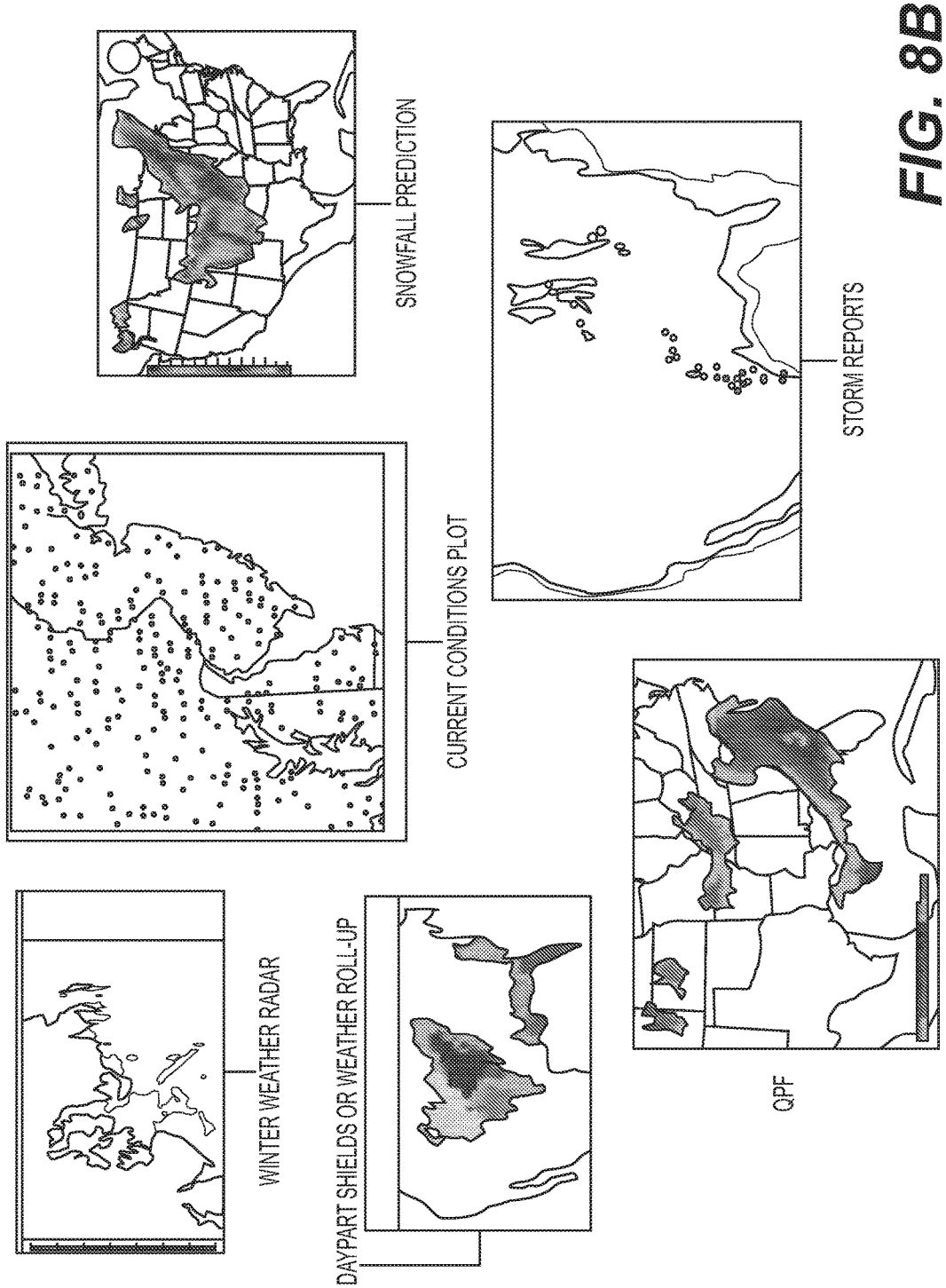

With reference to FIGS. 8A and 8B, underlays are graphic or textual visualizations of current conditions or going forecasts that provide guidance for the placement of Qualifiers, Filters and Blurbs. The GUI allows for multiple weather information layers to be plotted on the Earth. This provides visualization of forecast guidance and observations to underpin the placement of FBQ polygons in time and space. A number of different underlays can be plotted on the map, including, but not limited to, current condition data, such as radar, surface observations and satellite; forecast data; and Numerical Model data, such as the ECMWF and the NAM (widely available government model simulations). FIG. 8A, in particular, shows weather elements from a published Forecast on Demand for a daypart or day. The weather elements are used to determine the extent and makeup of a Filter for the applicable time period.

Figure 9:
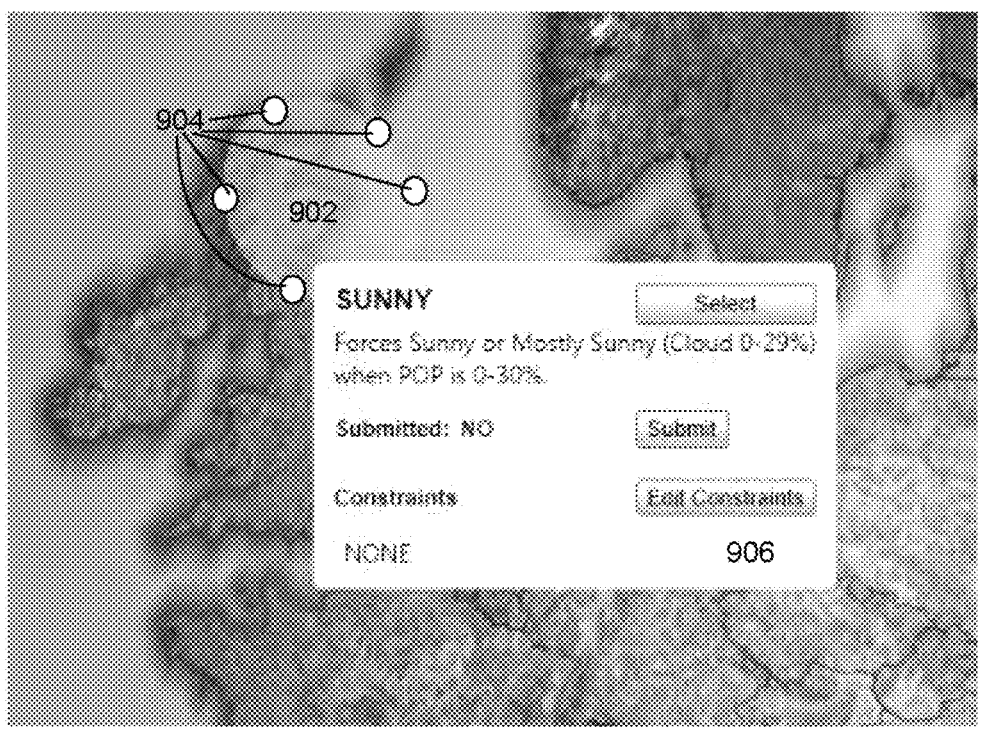
FIG. 9 illustrates an example process to create Filters, Blurbs and Qualifiers as polygon regions, such as shown in FIG. 4.

As described above, Filters, Qualifiers and Blurbs (FBQ's) are polygon(s) 902 that are drawn by a HOTL Forecaster as a closed set of control points 904 on the map area. With reference to FIG. 9, Filters, Blurbs and Qualifiers may be created by drawing a set of control points 904 using, e.g., a mouse or other pointing device. A last point may be identified and a polygon 902 will be scribed or closed-off. Optionally or additionally, the polygon may be drawing in one continuous movement by holding the mouse button down and drawing the desired shape. Hovering over the polygon 902 may present an FBQ definition 906.

With reference to FIG. 10, the properties of the filter may be edited in a dialog box 1000. A Filter Type may be defined using the Filter number drop down menu 1002, where the filter type can be changed. A valid time period for the FBQ may be adjusted using control 1004. This may also be performed using the time bar 706. Recurrence may be set using control 1006 to allow the FBQ to be repeated for the set number of days keeping all the same properties. A recurring FBQ is valid for some subset of the full day, thus its time interval must be less than 24 hours in length. Constraints may be set using button 1008 to define User Constraints that must be met in order to allow the FBQ to act on the forecast.

Figure 11:
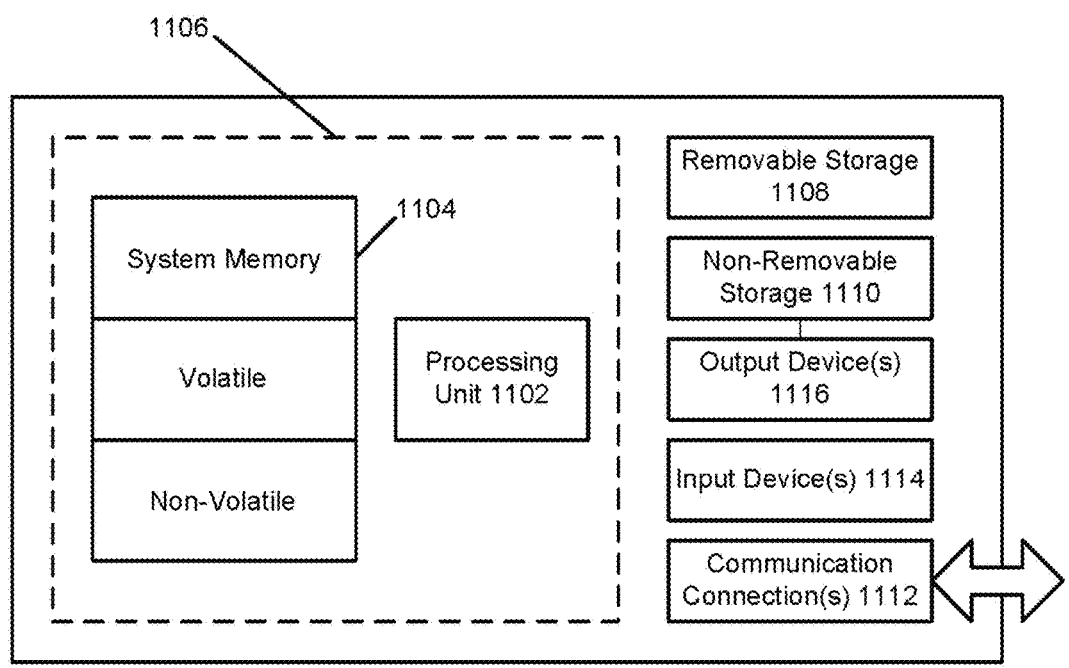
FIG. 11 shows an exemplary computing environment in which example embodiments and aspects may be implemented.

FIG. 11 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, servers, cloud-computing platforms, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of tangible computer readable media. Computer readable media can be any available tangible media that can be accessed by device 1100 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communications connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While the present disclosure has been described in connection with various implementations shown in the figures, it is to be understood that other similar implementations may be used or modifications and additions may be made to the described implementations for performing the same function of the present disclosure without deviating therefrom. For example, one skilled in the art will recognize that the implementations as described in the present disclosure may apply to any computing device or environment, and may be applied to any number of such computing devices connected via a communications network, and interacting across the network. Furthermore, the present disclosure may be implemented in or across a plurality of processing chips or devices, and storage may similarly be affected across a plurality of devices. Therefore, the present disclosure should not be limited to any single embodiment, but rather should be construed in breadth and scope in accordance with the appended claims.

What is claimed:

1. A method providing a human-over-the-loop interface on a client computing device to receive filters, qualifiers and blurbs that applied to a meteorological forecast, comprising:
    presenting a home region in a user interface of a computing device that is correlated to the geographic location where the client computing device is located;
    presenting, in the user interface, a list of the filters, the qualifiers and the blurbs for the home region, each filter placing a constraint on weather forecast data in a given spatial area circumscribed by the filter;
    presenting, in the user interface, a time bar to set a temporal period to which the filters, the qualifiers and the blurbs apply;
    plotting, by the computing device, weather information layers that provide a visualization of forecast guidance and observations in the user interface;
    receiving inputs in the user interface to place the filters, the qualifiers and the blurbs on the geographic location to set manual constraints on the forecast guidance; and
    publishing the meteorological forecast upon receipt of a user request.

2. The method of claim 1, further comprising receiving properties of the filters, the properties including a filter type, a valid time period, a recurrence value and user constraints in the user interface.

3. The method of claim 1, further comprising displaying, in the user interface, a map of the home region having coloring to denote topography.

4. The method of claim 1, further comprising displaying, in the user interface, underlays that include graphic or textual visualizations of conditions or forecasts to provide guidance for the placement of the filters, the qualifiers and the blurbs.

5. The method of claim 1, further comprising:
    displaying, in the user interface, multiple weather information layers that are plotted to provide a visualization of forecast guidance and observations; and
    receiving inputs to place the filters in accordance with the multiple weather information layers.

6. The method of claim 5, wherein the weather information layers include at least one of radar information, surface observations, satellite information, forecast data, and Numerical Model data.

7. The method of claim 1, further comprising defining the filters, the qualifiers and the blurbs as are polygons that are drawn in the user interface as a closed set of control points in the home region.

8. The method of claim 1, further comprising displaying, in the user interface, a dialog box to edit properties of the filters.

* * * * *